(12) United States Patent
Kudo et al.

(10) Patent No.: US 7,813,571 B2
(45) Date of Patent: Oct. 12, 2010

(54) IMAGE ENCODING APPARATUS AND IMAGE DECODING APPARATUS

(75) Inventors: Daiki Kudo, Tokyo (JP); Yoshihisa Yamada, Tokyo (JP); Hirofumi Nishikawa, Tokyo (JP); Yoshiaki Kato, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1127 days.

(21) Appl. No.: 10/585,781

(22) PCT Filed: Apr. 22, 2004

(86) PCT No.: PCT/JP2004/005796

§ 371 (c)(1),
(2), (4) Date: Jul. 11, 2006

(87) PCT Pub. No.: WO2005/104563

PCT Pub. Date: Nov. 3, 2005

(65) Prior Publication Data

US 2009/0185751 A1    Jul. 23, 2009

(51) Int. Cl.
*G06K 9/36* (2006.01)
(52) U.S. Cl. .................................... 382/238
(58) Field of Classification Search ............. 382/238
See application file for complete search history.

(56) References Cited

U.S. PATENT DOCUMENTS

| | | | |
|---|---|---|---|
| 5,559,557 A | 9/1996 | Kato et al. | |
| 5,959,674 A | 9/1999 | Jang et al. | |
| 6,072,910 A * | 6/2000 | Maeda et al. | 382/253 |
| 6,466,620 B1 | 10/2002 | Lee et al. | |
| 6,519,284 B1 * | 2/2003 | Pesquet-Popescu et al. | 375/240.11 |
| 7,437,008 B2 * | 10/2008 | Shen et al. | 382/238 |
| 2003/0113026 A1 * | 6/2003 | Srinivasan et al. | 382/239 |

(Continued)

FOREIGN PATENT DOCUMENTS

JP          6-165155 A      6/1994

(Continued)

OTHER PUBLICATIONS

Published by OHMSHA, "MPEG", compiled by the Institute of Television Engineer of Japan, Apr. 20, 1996, Japan, p. 106.

*Primary Examiner*—John B Strege
*Assistant Examiner*—Nirav G Patel
(74) *Attorney, Agent, or Firm*—Birch, Stewart, Kolasch & Birch, LLP

(57) ABSTRACT

An image encoding apparatus includes a converter 1 for receiving an image signal, and for converting the image signal of individual blocks to DC components and AC components by orthogonal transformation of the individual blocks of an image frame; a predicted reference value generator 2 for receiving the image signal, and for generating a predicted reference value of each image frame from DC components resulting from the orthogonal transformation of left-edge blocks of the image frame; and a differential unit 3 for obtaining difference values between the DC components output from the converter 1 and the predicted reference value generated by the predicted reference value generator 2. The image encoding apparatus outputs a bit stream by quantizing and variable-length encoding the AC components and difference values obtained by the differential unit 3, and by quantizing and variable-length encoding the predicted reference value to be added to a header.

8 Claims, 8 Drawing Sheets

U.S. PATENT DOCUMENTS

2004/0161156 A1* 8/2004 Matsubara .................. 382/232
2005/0069215 A1* 3/2005 Awano ....................... 382/252
2005/0243920 A1* 11/2005 Murakami et al. ..... 375/240.12

FOREIGN PATENT DOCUMENTS

| JP | 6-205401 A | 7/1994 |
|---|---|---|
| JP | 7-30771 A | 1/1995 |
| JP | 2611555 B2 | 2/1997 |
| JP | 10-108189 A | 4/1998 |
| JP | 10-126793 A | 5/1998 |
| JP | 10-155154 A | 6/1998 |
| JP | 2000-78579 A | 3/2000 |

* cited by examiner

— Left-edge first blocks

IMAGE ENCODING APPARATUS AND IMAGE DECODING APPARATUS

TECHNICAL FIELD

The present invention relates to an image encoding apparatus for encoding an image signal and an image decoding apparatus for decoding an encoded image signal.

BACKGROUND ART

To perform highly efficient encoding of an image signal, orthogonal transformation is usually used. A conventional image encoding apparatus converts an image signal to a DC component and AC component by transforming the image signal into a frequency domain by dividing an image frame into blocks with a prescribed size of 8×8 pixels, for example, and by applying two-dimensional orthogonal transformation such as DCT (Discrete Cosine Transform) to each block divided.

Then, as shown on page 106 of "MPEG", one of General Multimedia Selected Books, compiled by The Institute of Television Engineers of Japan, and published by Ohmsha, Apr. 20, 1996, it obtains difference values between the DC component with comparatively large energy and the DC components as predicted values of neighboring blocks, and carries out compression by variable-length encoding of the difference values.

Since the image has spatial correlation, a variable-length code table is set in such a manner as to have short code length when the difference values are small. Thus, when the correlation with the neighboring blocks is strong, the difference values become small, enabling highly efficient encoding. However, when the correlation with the neighboring blocks is weak, the encoding efficiency is decreased.

In addition, to encode the first block of the image frame, it obtains the difference values between the DC component after the orthogonal transformation and a predetermined default value. The default value is determined according to the encoding scheme, and uses a median value 1024 of a range 0-2047 after the orthogonal transformation of the image signal regardless of the input image, thereby decreasing the encoding efficiency as well.

With the foregoing configuration, the conventional image encoding apparatus has a problem of being unable to carry out the highly efficient encoding when encoding the first block or a block with weak correlation with the neighboring blocks.

The present invention is implemented to solve the foregoing problems. Therefore it is an object of the present invention to provide an image encoding apparatus capable of carrying out highly efficient encoding when encoding the first block or a block with weak correlation with neighboring blocks.

Another object of the present invention is to provide an image decoding apparatus capable of decoding an image signal passing through the highly efficient encoding by the image encoding apparatus.

DISCLOSURE OF THE INVENTION

An image encoding apparatus in accordance with the present invention includes: a converter for receiving an image signal, and for carrying out orthogonal transformation on a block by block basis of an image frame to convert the image signal of individual blocks to DC components and AC components; a predicted reference value generator for receiving the image signal, and for generating a predicted reference value of each image frame from individual DC components obtained by orthogonal transformation of left-edge blocks of the image frame; and a differential unit for obtaining difference values between the DC components output from the converter and the predicted reference value generated by the predicted reference value generator. The image encoding apparatus carries out quantizing and variable-length encoding of the AC components and the difference values obtained by the differential unit, carries out quantizing and variable-length encoding of the predicted reference value to be added to a header, and outputs as a bit stream.

It offers an advantage of being able to achieve the highly efficient encoding even when encoding the first block or the blocks with weak correlation with neighboring blocks.

BEST MODE FOR CARRYING OUT THE INVENTION

The best mode for carrying out the invention will now be described with reference to the accompanying drawings to explain the present invention in more detail.

Embodiment 1

Figure 1:
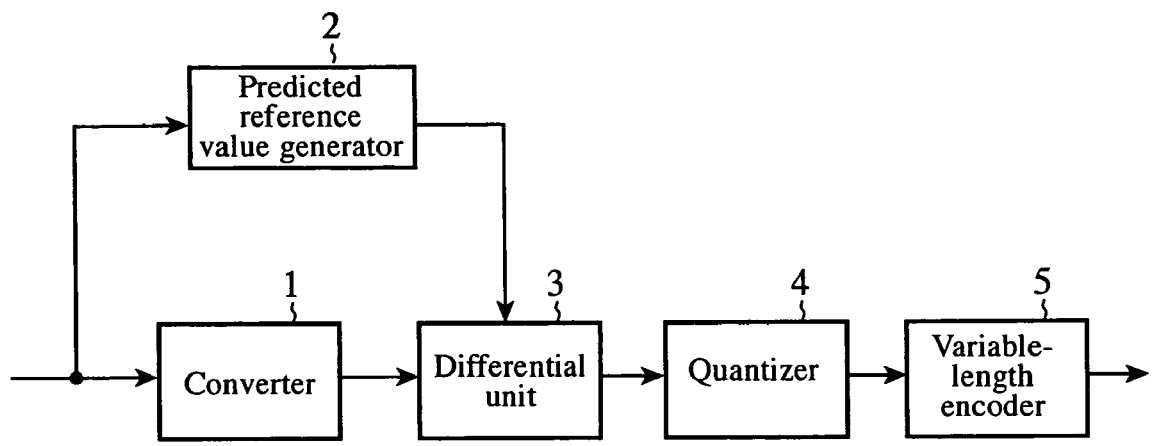
FIG. 1 is a block diagram showing a configuration of an image encoding apparatus of an embodiment 1 in accordance with the present invention.

FIG. 1 is a block diagram showing a configuration of an image encoding apparatus of an embodiment 1 in accordance with the present invention. The image encoding apparatus has a converter 1, predicted reference value generator 2, differential unit 3, quantizer 4 and variable-length encoder 5.

Next, the operation will be described.

Figure 2:
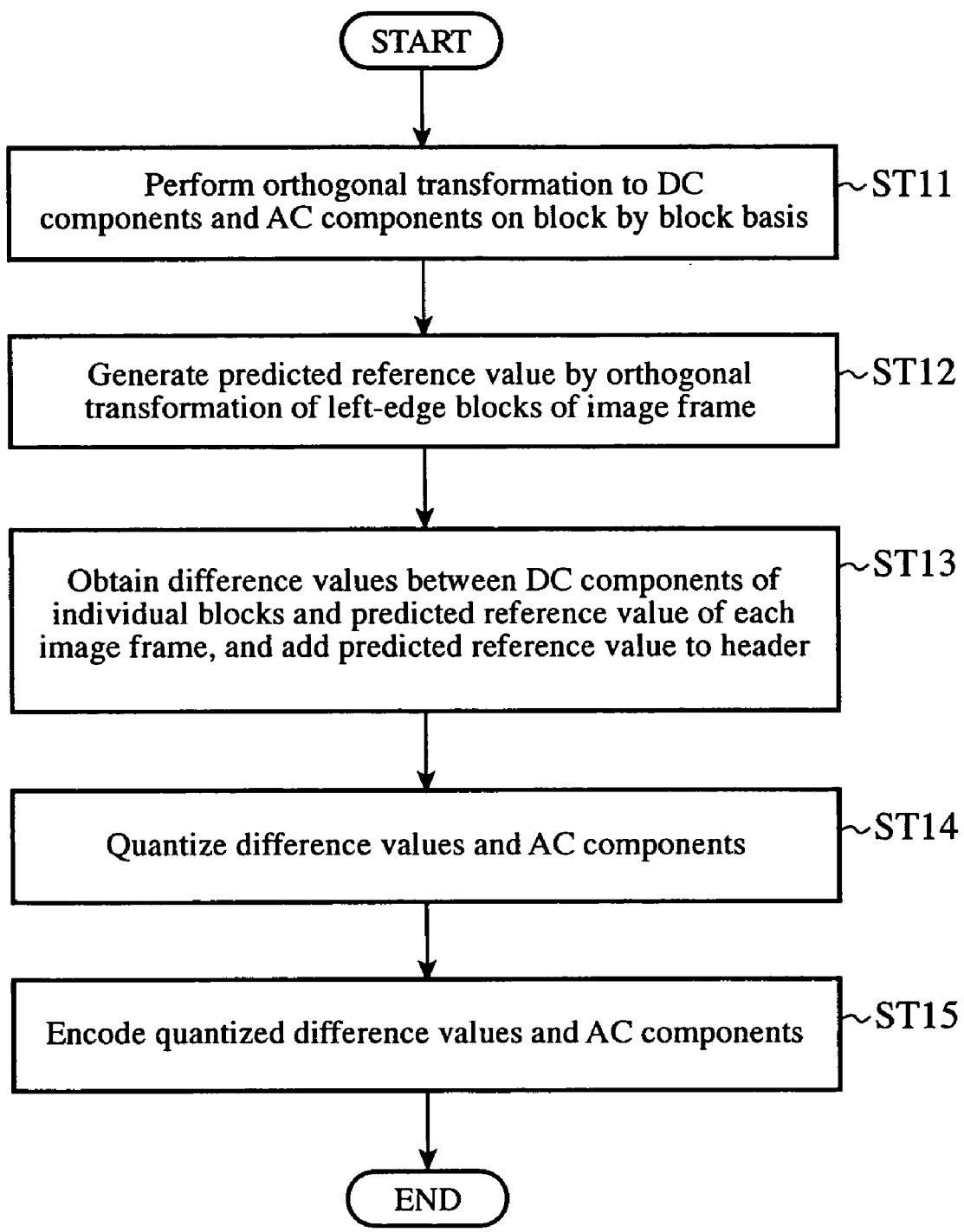
FIG. 2 is a flowchart illustrating a flow of the processing of the image encoding apparatus of the embodiment 1 in accordance with the present invention.

FIG. 2 is a flowchart illustrating a flow of the processing of the image encoding apparatus of the embodiment 1 in accordance with the present invention. At step ST11, the converter 1 receives an image signal of a still image or moving image, and carries out orthogonal transformation on a predetermined block by block basis, thereby converting the image signal of each block to a DC component and AC component.

At step ST12, the predicted reference value generator 2 receives the image signal, carries out the orthogonal transformation of left-edge blocks of the image frame, and obtains the average value of the DC components transformed, thereby generating the predicted reference values of the individual image frames, quantizing and encoding the predicted reference values of the individual image frames generated, and outputting the predicted reference values generated and the predicted reference values of the image frames quantized and encoded.

Figure 3:
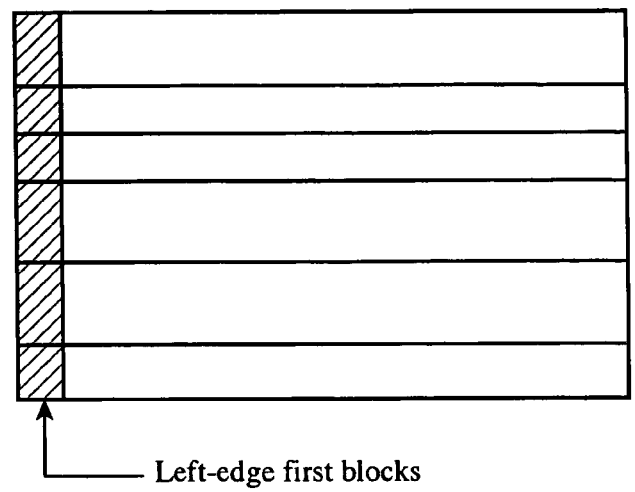
FIG. 3 is a diagram showing left-edge blocks of an image frame of the image encoding apparatus of the embodiment 1 in accordance with the present invention.

FIG. 3 is a diagram showing left-edge blocks of the image frame, in which diagonally shaded portions indicate the left-edge blocks of the image frame. Thus, the predicted reference value generator 2 generates the average value of the DC components of the left-edge blocks shown by the diagonally shaded portions of the image frame as shown in FIG. 3 as the predicted reference value of the image frame. Although the average value of the DC components of the individual blocks is used, the mode or median of the DC components of the individual blocks can also be used.

At step ST13 of FIG. 2, the differential unit 3 receives the DC components and AC components of the individual blocks output from the converter 1, and obtains the difference values between the DC components of the individual blocks and the predicted reference value of each image frame generated by the predicted reference value generator 2. In this case, since the difference values are obtained from the predicted reference value generated from the average value of the DC components of the left-edge blocks of the image frame, even the blocks with weak correlation with neighboring blocks have small difference values. Then, the differential unit 3 adds the predicted reference value quantized and encoded by the predicted reference value generator 2 to a header, and outputs the obtained difference values and the input AC components together with the header.

At step ST14, the quantizer 4 quantizes the difference values and AC components fed from the differential unit 3, and outputs the quantized difference values and AC components together with the header to which the predicted reference value of each image frame is added.

At step ST15, the variable-length encoder 5 encodes the quantized difference values and AC components according to the variable-length code table. In this case, since the difference values are small, even the first blocks and the blocks with weak correlation with neighboring blocks can be subjected to highly efficient encoding because the code lengths resulting from the encoding according to the variable-length code table become short. Thus, the variable-length encoder 5 outputs, as a bit stream, the encoded difference values and AC components together with the headers to which the predicted reference values of individual image frames are added.

Although the predicted reference value generator 2 generates the predicted reference value of the image frame by the orthogonal transformation of the left-edge blocks of the image frame, and by calculating the average value of the transformed DC components in the present embodiment 1, this is not essential. For example, the predicted reference value of the image frame can be generated by the orthogonal transformation of the single block at the upper left corner of FIG. 3, and by using the DC component transformed.

As described above, when encoding the first block or the blocks with weak correlation with neighboring blocks, the present embodiment 1 offers an advantage of being able to carry out highly efficient encoding by encoding the difference values between the DC components of the individual blocks passing through the orthogonal transformation by the converter 1 and the predicted reference value obtained from the average value of the DC components of the left-edge blocks of the image frame generated by the predicted reference value generator 2.

Embodiment 2

Figure 4:
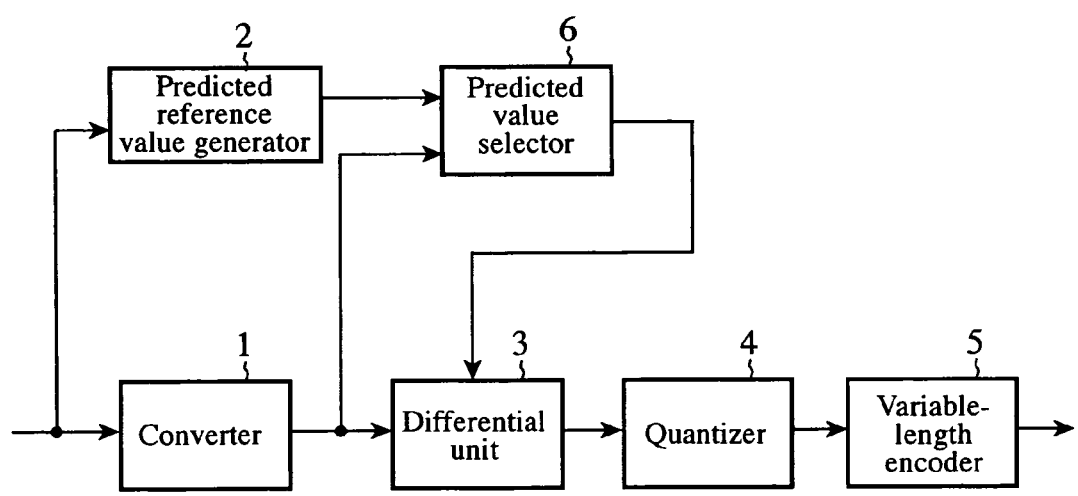
FIG. 4 is a block diagram showing a configuration of an image encoding apparatus of an embodiment 2 in accordance with the present invention.

FIG. 4 is a block diagram showing a configuration of an image encoding apparatus of an embodiment 2 in accordance with the present invention. The image encoding apparatus includes a converter 1, predicted reference value generator 2, differential unit 3, quantizer 4, variable-length encoder 5 and predicted value selector 6.

Next, the operation will be described.

Figure 5:
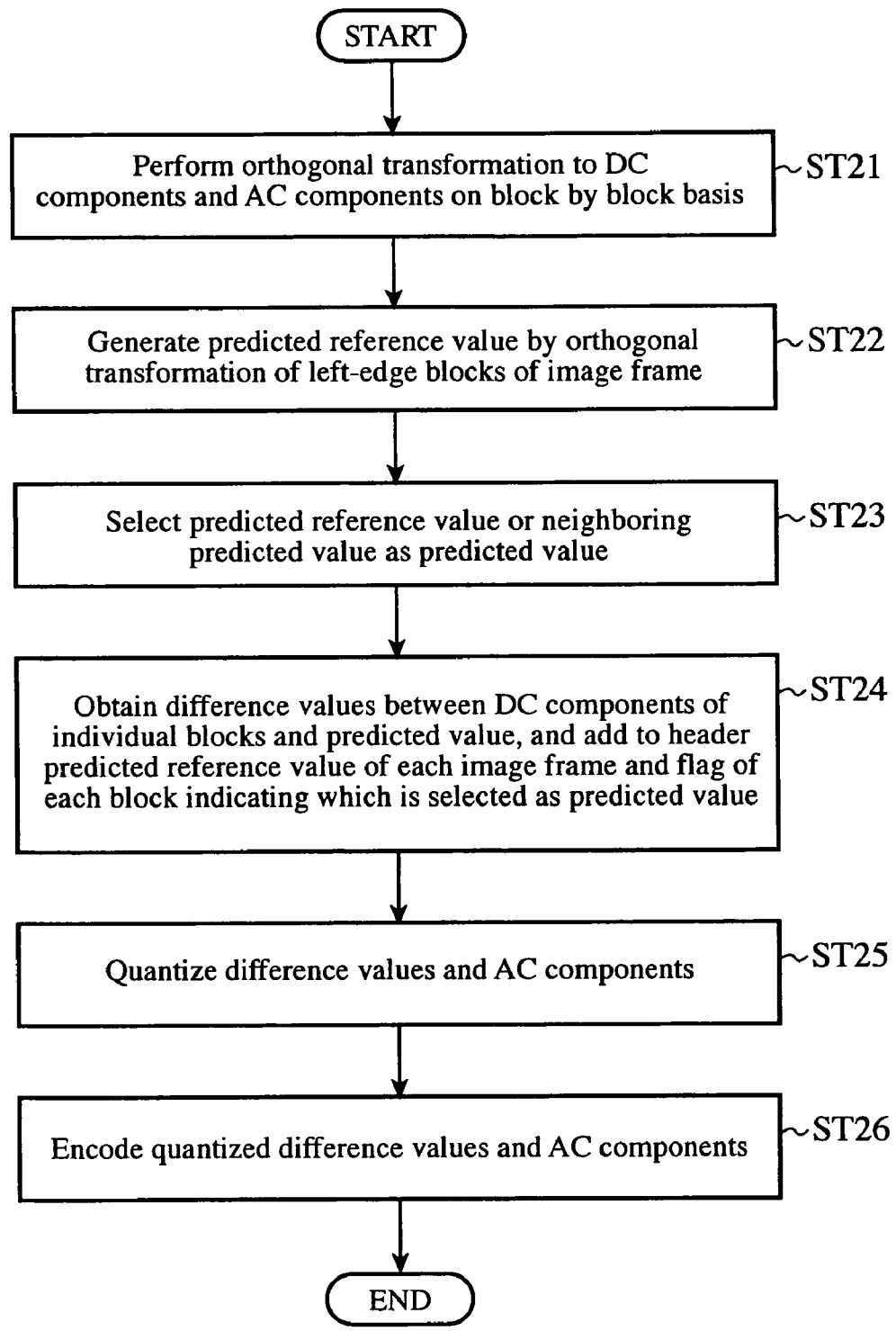
FIG. 5 is a flowchart illustrating a flow of the processing of the image encoding apparatus of the embodiment 2 in accordance with the present invention.

FIG. 5 is a flowchart illustrating a flow of the processing of the image encoding apparatus of the embodiment 2 in accordance with the present invention. At step ST21, the converter 1 receives an image signal of a still image or moving image, and carries out orthogonal transformation on a predetermined block by block basis, thereby converting the image signal of each block to a DC component and AC component.

At step ST22, the predicted reference value generator 2 receives the image signal, carries out the orthogonal transformation of left-edge blocks of the image frame, and obtains the average value of the DC components divided, thereby generating the predicted reference values of the individual image frames, quantizing and encoding the predicted reference values generated, and outputting the predicted reference values generated and the predicted reference values of the image frames quantized and encoded. Although the average value of the DC components of the individual blocks is used here, the mode or median of the DC components of the individual blocks can also be used.

At step ST23, the predicted value selector 6 obtains the difference values between the DC components of the blocks fed from the converter 1 and the predicted reference value of each image frame fed from the predicted reference value generator 2; obtains the difference values between the DC components of the blocks fed from the converter 1 and the neighboring predicted values which are the DC components of the immediately previous blocks fed from the converter 1; selects, as a predicted value for each block, the predicted reference value or neighboring predicted value at the time when the difference values with a smaller number of bits are obtained when quantizing and encoding the two difference values, and outputs the predicted values of the individual blocks selected; encodes a flag for each block, which indicates whether the predicted reference value or neighboring predicted value is selected as the predicted value; and outputs the flags for the individual encoded blocks and the predicted reference values of the individual image frames quantized and encoded by the predicted reference value generator 2. As for the flags, a fixed-length flag of "0" and "1" can also be used.

At step ST24, the differential unit 3 receives the DC component and AC component of each block output from the converter 1, and obtains the difference value between the DC component of each block and the predicted value selected by the predicted value selector 6. In this case, the difference value is obtained either from the predicted reference value that is obtained from the average value of the DC components of the left-edge blocks in the image frame, or from the neighboring predicted value which is the DC component of the immediately previous block. Thus, even the first block or the block with weak correlation with neighboring blocks has a small value. Then, the differential unit 3 adds to the header the predicted reference values of the individual quantized and encoded image frames, and the encoded flags for the individual blocks or the fixed-length flags "0" or "1", and outputs the difference values obtained and the input AC components together with the header.

At step ST25, the quantizer 4 quantizes the difference values and AC components fed from the differential unit 3, and outputs the quantized difference values and AC components together with the header to which the predicted reference value of each image frame and the flag for each block are added.

At step ST26, the variable-length encoder 5 encodes the quantized difference values and AC components according to the variable-length code table. In this case, since the difference values are small, even the first blocks and the blocks with weak correlation with neighboring blocks can be subjected to highly efficient encoding because the code lengths resulting from the encoding according to the variable-length code table become short. Thus, the variable-length encoder 5 outputs, as a bit stream, the encoded difference values and AC components together with the headers to which the predicted reference values of individual image frames and the flags of the individual blocks are added.

Although the predicted reference value generator 2 generates the predicted reference value of the image frame by the orthogonal transformation of the left-edge blocks of the image frame, and by calculating the average value of the transformed DC components in the present embodiment 2, this is not essential. For example, the predicted reference value of the image frame can be generated by the orthogonal transformation of the single block at the upper left corner of FIG. 3, and by using the DC component transformed.

As described above, when encoding the first block or the blocks with weak correlation with neighboring blocks, the present embodiment 2 offers an advantage of being able to carry out highly efficient encoding by encoding the difference values between the DC components of the individual blocks passing through the orthogonal transformation by the converter 1 and the predicted reference value or neighboring predicted value, which is the predicted value selected by the predicted value selector 6.

Embodiment 3

The block diagram showing the configuration of the image encoding apparatus of the embodiment 3 in accordance with the present invention is the same as that of FIG. 4 of the embodiment 2.

Next, the operation will be described.

Although at step ST23 of FIG. 5 in the foregoing embodiment 2, the predicted value selector 6 selects the predicted value for each predetermined block, the predicted value selector 6 in the present embodiment 3 selects the predicted value for each plurality of blocks, that is, for each macroblock consisting of four blocks, for example, and generates for each macroblock a flag indicating whether it selects the predicted reference value or the neighboring predicted value as the predicted value.

More specifically, the predicted value selector 6 calculates the sum total of the number of bits when quantizing and encoding the difference values with using the predicted reference values for all the four blocks in the macroblock, and the sum total of the number of bits when quantizing and encoding the difference values with using the neighboring predicted values; selects as the predicted value of each macroblock the predicted reference value or neighboring predicted value at the time when a smaller sum total of the number of bits is obtained; and outputs the predicted value selected for each macroblock.

Thus outputting the predicted values for the individual macroblocks makes it possible to reduce the data volume of the flags indicating whether the predicted reference value or neighboring predicted value is selected as the predicted value to be added to the header. For example, assume that the image frame consists of 320×240 pixels, and is divided into blocks of 8×8 pixels. In this case, the number of blocks is 40×30=1200 blocks, and requires 1200 bits as the number of bits of the flags when the fixed-length flag of "0" and "1" is used as in the foregoing embodiment 2. In contrast, outputting the predicted values for the individual macroblocks each consisting of four blocks, the number of bits of the flag can be reduced to ¼, 300 bits, thereby being able to reduce by 900 bits.

The remaining processing is the same as that of the foregoing embodiment 2.

As described above, the present embodiment 3 offers not only the same advantage as that of the foregoing embodiment 2, but also an advantage of being able to reduce the data volume of the flags indicating which predicted value is selected to be added to the header, by selecting the predicted value for each macroblock consisting of a plurality of blocks.

Embodiment 4

The block diagram showing the configuration of the image encoding apparatus of the embodiment 4 in accordance with the present invention is the same as that of FIG. 4 of the embodiment 2.

Next, the operation will be described.

In the foregoing embodiment 2, the predicted value selector 6 selects the predicted value for each predetermined block at step ST23 of FIG. 5. In contrast, in the present embodiment 4, the predicted value selector 6 selects the predicted value for each region such as a slice or object, and generates a flag indicating whether it selects the predicted reference value or neighboring predicted value for each region as the predicted value.

More specifically, the predicted value selector 6 calculates for each region the sum total of the number of bits when quantizing and encoding the difference values with using the predicted reference value for all the blocks in the region, and the sum total of the number of bits when quantizing and encoding the difference values with using the neighboring predicted values; selects as the predicted value of each region the predicted reference value or neighboring predicted value at the time when a smaller sum total of the number of bits is obtained; and outputs the predicted value selected for each region.

Figure 6:
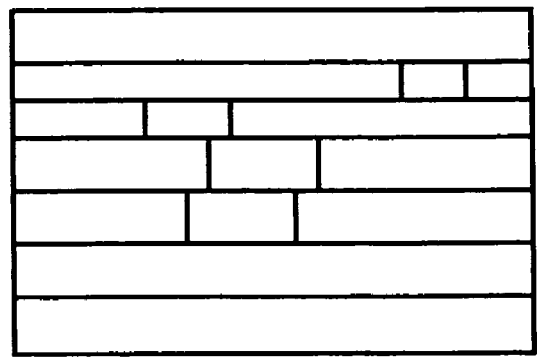
FIG. 6 is a diagram showing an example in which an image frame is divided into individual slice regions in the image encoding apparatus of an embodiment 4 in accordance with the present invention.

FIG. 6 is a diagram showing an example in which the image frame is divided into individual regions of slices. Thus outputting the predicted values for the individual regions such as a slice or object makes it possible to reduce the data volume of the flags indicating whether the predicted reference value or neighboring predicted value is selected as the predicted value to be added to the header.

The remaining processing is the same as that of the foregoing embodiment 2.

As described above, the present embodiment 4 offers not only the same advantage as that of the foregoing embodiment 2, but also an advantage of being able to reduce the data volume of the flags indicating which predicted value is selected to be added to the header, by selecting the predicted value for each region such as a slice or object.

Embodiment 5

The block diagram showing the configuration of the image encoding apparatus of the embodiment 5 in accordance with the present invention is the same as that of FIG. 1 of the embodiment 1.

Next, the operation will be described.

Figure 7:
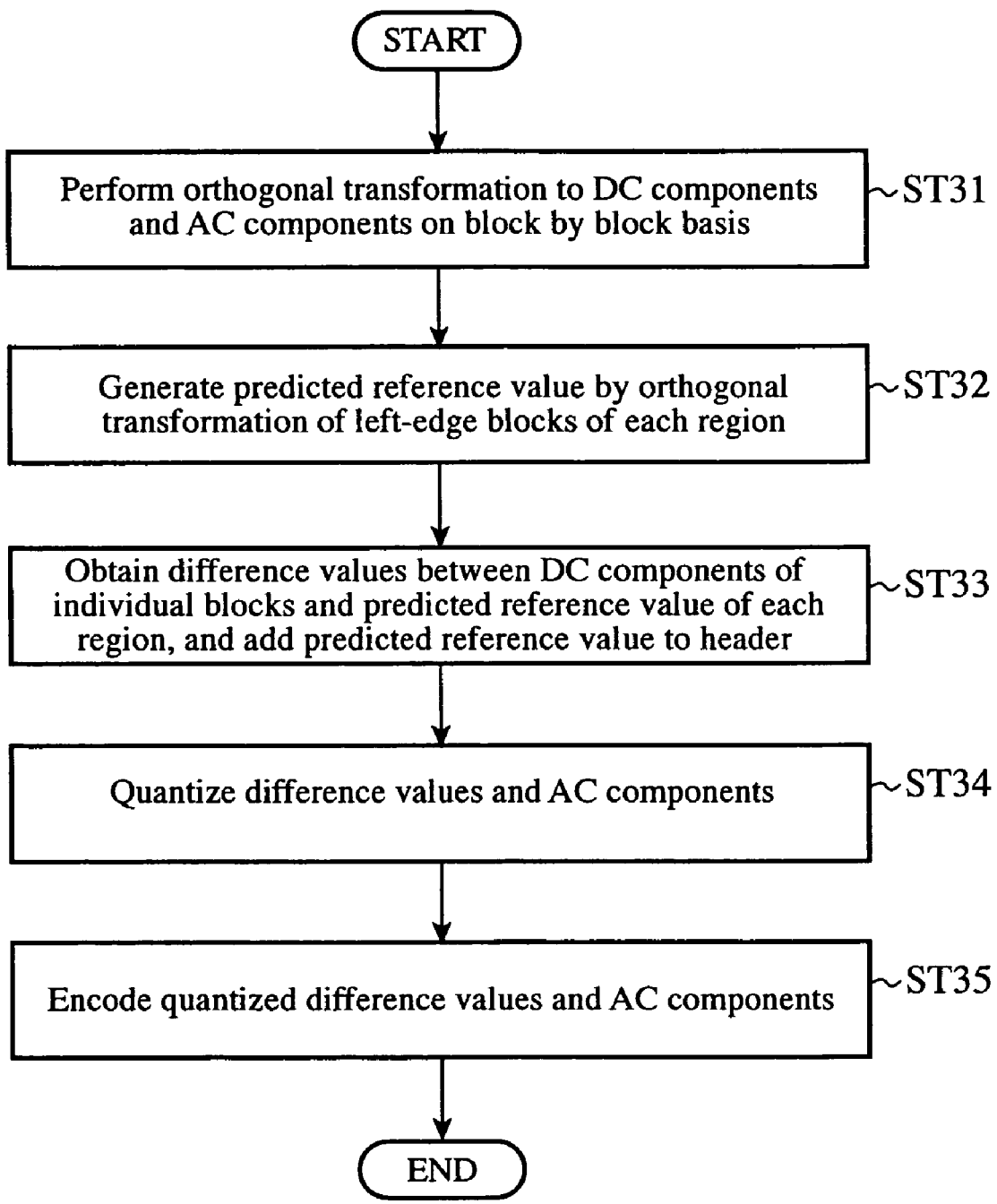
FIG. 7 is a flowchart illustrating a flow of the processing of the image encoding apparatus of an embodiment 5 in accordance with the present invention.

FIG. 7 is a flowchart illustrating a flow of the processing of the image encoding apparatus of an embodiment 5 in accordance with the present invention. At step ST31, the converter 1 receives an image signal of a still image or moving image, and carries out orthogonal transformation on a predetermined block by block basis, thereby converting the image signal of each block to a DC component and AC component.

At step ST32, the predicted reference value generator 2 receives the image signal, and carries out the orthogonal transformation of the left-edge blocks of the individual regions such as a slice or object of the image frame, thereby generating the predicted reference values of the individual regions from the values of the DC component converted, quantizing and encoding the predicted reference values of the individual regions generated, and outputting the predicted reference values generated and the predicted reference values quantized and encoded.

Figure 8:
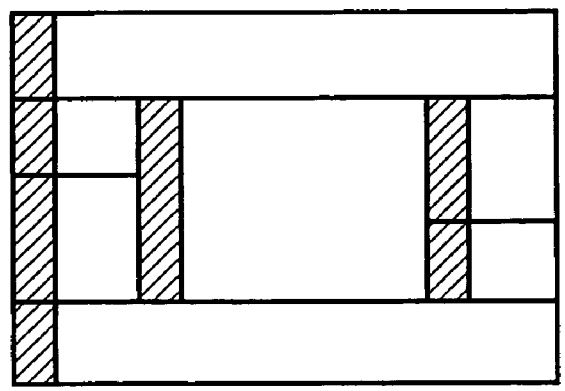
FIG. 8 is a diagram showing left-edge blocks of each region of an image frame of the image encoding apparatus of the embodiment 5 in accordance with the present invention.

FIG. 8 is a diagram showing left-edge blocks of the individual regions of the image frame, in which diagonally shaded portions indicate the left-edge blocks of the individual regions of the image frame. Thus, the predicted reference value generator 2 generates the values of the DC components of the left-edge blocks of the individual regions indicated by the diagonally shaded portions of the image frame of FIG. 8 as the predicted reference values of the individual regions.

At step ST33 of FIG. 7, the differential unit 3 receives the DC component and AC component of each block output from the converter 1, and obtains the difference values between the DC components of the individual blocks and the predicted reference value of each corresponding region generated by the predicted reference value generator 2. In this case, since the difference values are obtained from the predicted reference value obtained from the DC components of the left-edge blocks of the individual regions, even the first blocks or the blocks with weak correlation with neighboring blocks have small difference values. Then, the differential unit 3 adds to a header the predicted reference values of the individual regions quantized and encoded by the predicted reference value generator 2, and outputs the obtained difference values and the input AC components together with the header.

At step ST34, the quantizer 4 quantizes the difference values and AC components fed from the differential unit 3, and outputs the quantized difference values and AC components together with the headers to which the predicted reference values of the individual regions are added.

At step ST35, the variable-length encoder 5 encodes the quantized difference values and AC components according to the variable-length code table. In this case, since the difference values are small even in the first block and the blocks with weak correlation with neighboring blocks, the code lengths resulting from the encoding according to the variable-length code table become short, thereby being able to achieve the highly efficient encoding. Thus, the variable-length encoder 5 outputs, as a bit stream, the encoded difference values and AC components together with the headers to which the predicted reference values of the individual regions are added.

As described above, when encoding the first block or the blocks with weak correlation with neighboring blocks, the present embodiment 5 offers an advantage of being able to carry out highly efficient encoding by encoding the difference values between the DC components of the individual blocks passing through the orthogonal transformation by the converter 1 and the predicted reference value obtained from the DC components of the left-edge blocks of the individual regions generated by the predicted reference value generator 2.

Embodiment 6

The block diagram showing the configuration of the image encoding apparatus of the embodiment 6 in accordance with the present invention is the same as that of FIG. 4 of the foregoing embodiment 2.

Next, the operation will be described.

Figure 9:
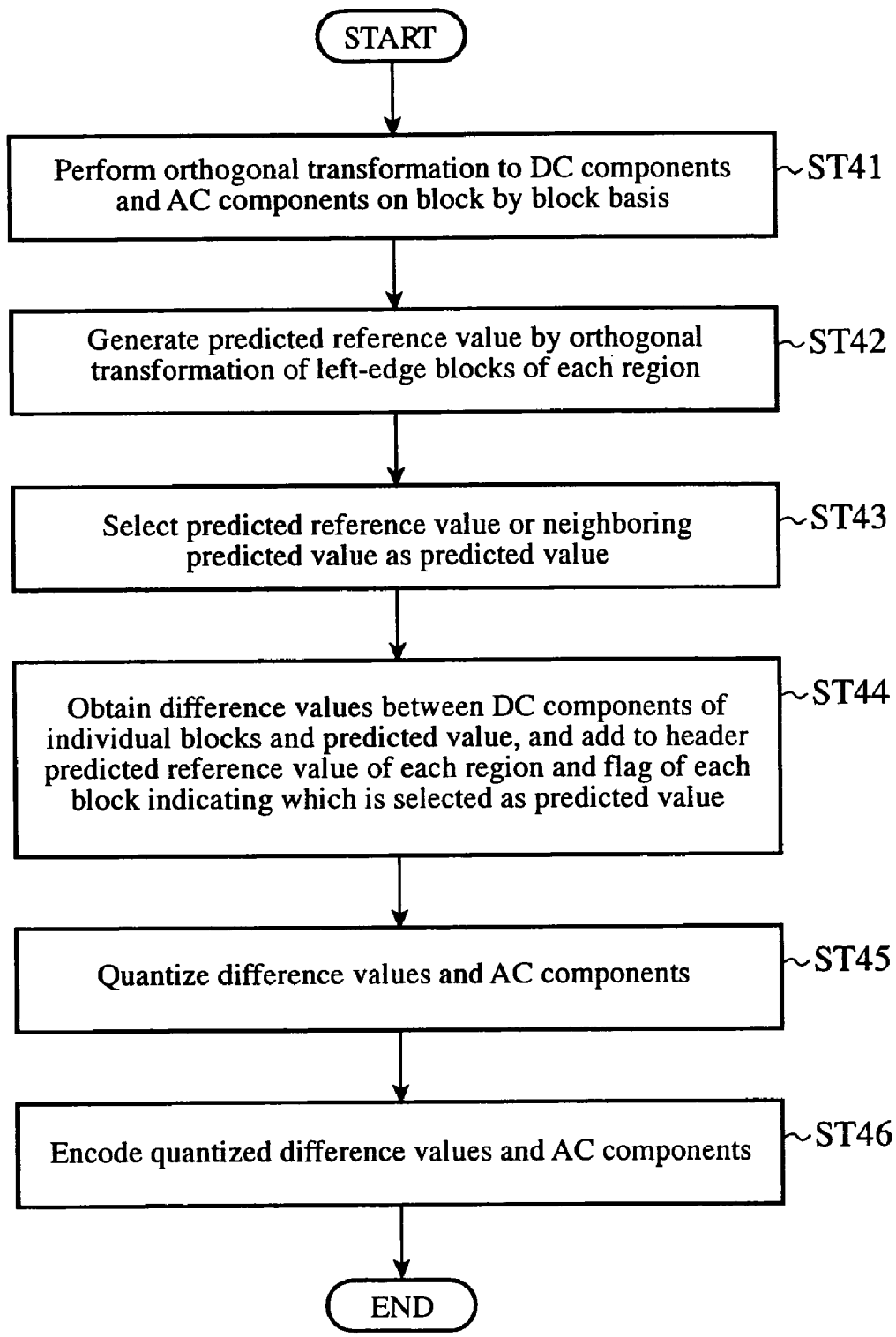
FIG. 9 is a flowchart illustrating a flow of the processing of the image encoding apparatus of an embodiment 6 in accordance with the present invention.

FIG. 9 is a flowchart illustrating a flow of the processing of the image encoding apparatus of the embodiment 6 in accordance with the present invention. At step ST41, the converter 1 receives an image signal of a still image or moving image, and carries out orthogonal transformation on a predetermined block by block basis, thereby converting the image signal of each block to a DC component and AC component.

At step ST42, the predicted reference value generator 2 receives the image signal, and carries out the orthogonal transformation of the left-edge blocks of the individual regions such as a slice or object of the image frame, thereby generating the predicted reference values of the individual regions from the DC components converted, quantizing and encoding the predicted reference values of the individual regions generated, and outputting the predicted reference values of the individual regions generated and the predicted reference values of the individual regions quantized and encoded.

At step ST43, the predicted value selector 6 obtains the difference values between the DC components of the blocks fed from the converter 1 and the predicted reference values of the individual regions fed from the predicted reference value generator 2; obtains the difference values between the DC components of the blocks fed from the converter 1 and the neighboring predicted values which are the DC components of the immediately previous blocks fed from the converter 1; selects, as a predicted value for each block, the predicted reference value or neighboring predicted value at the time when the difference values with a smaller number of bits are obtained when quantizing and encoding the two difference values, and outputs the predicted values of the individual blocks selected; generates a flag for each block, which indicates whether the predicted reference value or neighboring predicted value is selected as the predicted value; encodes the flags generated; and outputs the flags encoded and the predicted reference values of the individual regions quantized and encoded. As for the flags, a fixed-length flag of "0" and "1" can be used.

At step ST44, the differential unit 3 receives the DC component and AC component of each block output from the converter 1, and obtains the difference value between the DC component of each block and the predicted value selected by the predicted value selector 6. In this case, the difference value is obtained either from the predicted reference value that is obtained from the DC components of the left-edge blocks in the individual regions, or from the neighboring predicted value which is the DC component of the immediately previous block. Thus, even the first block or the block with weak correlation with neighboring blocks has a small difference value. Then, the differential unit 3 adds to the headers the predicted reference values of the individual regions quantized and encoded and the flags of individual blocks indicating which one of the predicted reference value and neighboring predicted value is selected as the quantized and encoded predicted value, and outputs the difference values obtained and the input AC components together with the headers.

At step ST45, the quantizer 4 quantizes the difference values and AC components fed from the differential unit 3, and outputs the quantized difference values and AC components together with the headers to which the predicted reference values of the individual regions and the flags for the individual blocks are added.

At step ST46, the variable-length encoder 5 encodes the quantized difference values and AC components according to the variable-length code table. In this case, since the difference values are small even in the first block and the blocks with weak correlation with the neighboring blocks, the code lengths resulting from the encoding according to the variable-length code table become short, thereby being able to achieve the highly efficient encoding. Thus, the variable-length encoder 5 outputs the encoded difference values and AC components together with the headers to which the predicted reference values of the individual regions and the flags of the individual blocks are added.

Although the present embodiment 6 selects the predicted values for individual blocks, it can select the predicted values for the individual macroblocks each consisting of a plurality of blocks as in the foregoing embodiment 3, or for the individual regions such as a slice or object as in the foregoing embodiment 4.

As described above, when encoding the first block or the blocks with weak correlation with neighboring blocks, the present embodiment 6 offers an advantage of being able to carry out highly efficient encoding by encoding the difference values between the DC components of the individual blocks passing through the orthogonal transformation by the converter 1 and the predicted reference values or neighboring predicted values, which are the predicted values selected by the predicted value selector.

Embodiment 7

The block diagram showing the configuration of the image encoding apparatus of the embodiment 7 in accordance with the present invention is the same as that of FIG. 1 of the foregoing embodiment 1 or that of FIG. 4 of the foregoing embodiment 2. It is assumed here that the image encoding apparatus receives an image signal of a moving image.

Next, the operation will be described.

As for moving images, they have usually temporal correlation except for the case of scene changes. In view of this, when the image encoding apparatus of the foregoing embodiment 1 or embodiment 2 encodes the moving images, the predicted reference value generator 2 of FIG. 1 or FIG. 4 generates the average value, mode or median of the individual DC components, which are obtained by carrying out the orthogonal transformation and division of the left-edge blocks of the past image frame or future image frame, as the predicted reference value of the present image frame. The remaining processing is the same as that of the foregoing embodiment 1 or the foregoing embodiment 2.

It is possible for the present embodiment 7 to select the predicted values for the individual macroblocks each consisting of a plurality of blocks as in the foregoing embodiment 3, or for the individual regions such as a slice or object as in the foregoing embodiment 4.

In addition, as in the foregoing embodiment 5 or 6, it is possible for the predicted reference value generator 2 in the present embodiment 7 to carry out the orthogonal transformation of the left-edge blocks in the individual regions such as a slice or object in the past image frame or future image frame, and to generate the predicted reference values of the individual regions of the present image frame from the DC components after the conversion.

As described above, when encoding the first block or the blocks with weak correlation with neighboring blocks, the present embodiment 7 offers an advantage of being able to carry out highly efficient encoding by generating the predicted reference value of the present image frame from the past image frame or future image frame.

Embodiment 8

Figure 10:
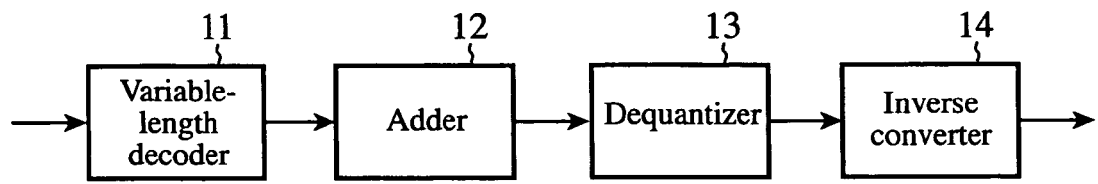
FIG. 10 is a block diagram showing a configuration of an image decoding apparatus of an embodiment 8 in accordance with the present invention.

FIG. 10 is a block diagram showing a configuration of an image decoding apparatus of an embodiment 8 in accordance with the present invention. The image decoding apparatus, which decodes the image signal passing through the highly efficient encoding by the image encoding apparatus of the foregoing embodiment 1, includes a variable-length decoder 11, adder 12, dequantizer 13 and inverse converter 14

Next, the operation will be described.

A bit stream sent from the image encoding apparatus of the foregoing embodiment 1 includes the quantized and encoded difference values and AC components of the individual blocks, and the predicted reference values of the individual quantized and encoded image frames.

The variable-length decoder 11 decodes the difference values and AC components of the individual blocks in the bit stream and the predicted reference value of each image frame. The adder 12, receiving the decoded difference values and AC components of the individual blocks and the predicted reference value of each image frame, obtains the DC components of the individual blocks by adding the difference values of the individual blocks and the predicted reference value of each image frame, and outputs the resultant DC components of the individual blocks and the input AC components of the individual blocks.

The dequantizer 13 dequantizes the DC components and AC components of the individual blocks. The inverse converter 14 carries out the inverse orthogonal transformation of the dequantized DC components and AC components of the individual blocks, and outputs the decoded image signal.

Although the present embodiment 8 decodes the image signal passing through the highly efficient encoding by the image encoding apparatus of the foregoing embodiment 1, it can also decode the image signal passing through the highly efficient encoding by the image encoding apparatus of the foregoing embodiment 5 or embodiment 7 by the same configuration.

As described above, the present embodiment 8 offers an advantage of being able to decode the image signal passing through the highly efficient encoding by the image encoding apparatus.

Embodiment 9

Figure 11:
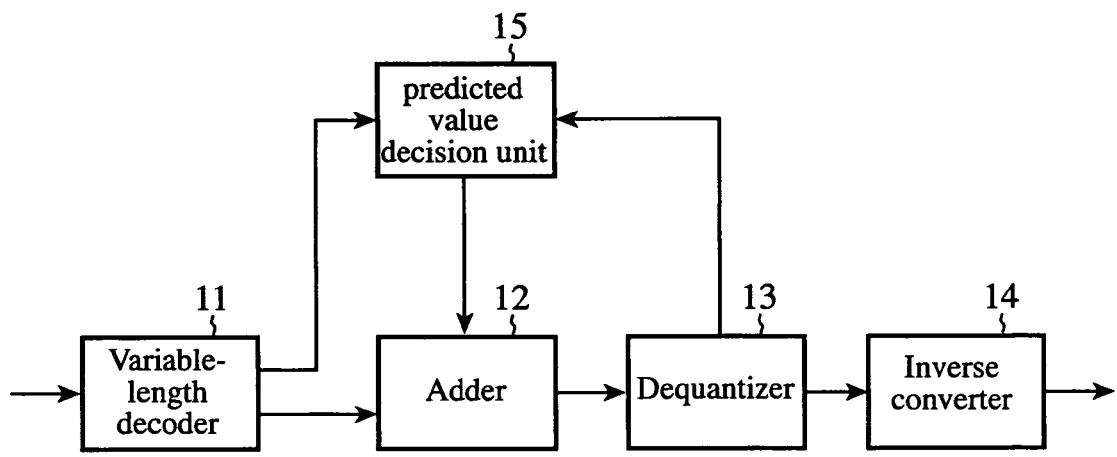
FIG. 11 is a block diagram showing a configuration of an image decoding apparatus of an embodiment 9 in accordance with the present invention.

FIG. 11 is a block diagram showing a configuration of an image decoding apparatus of an embodiment 9 in accordance with the present invention. The image decoding apparatus, which decodes the image signal passing through the highly efficient encoding by the image encoding apparatus of the foregoing embodiment 2, includes a variable-length decoder 11, adder 12, dequantizer 13, inverse converter 14 and predicted value decision unit 15.

Next, the operation will be described.

A bit stream sent from the image encoding apparatus of the foregoing embodiment 2 includes the quantized and encoded difference values and AC components of the individual blocks, the quantized and encoded predicted reference value of each image frame added to the header, and the flags for the individual encoded blocks indicating which one of the predicted reference value and neighboring predicted value of the immediately previous block is selected as the predicted value, or the fixed-length flag of "0" or "1".

The variable-length decoder 11 decodes the difference values and AC components of the individual blocks, the predicted reference value of each image frame, and the flags of the individual blocks, which are contained in the bit stream; supplies the adder 12 with the decoded difference values and AC components of the individual blocks; and supplies the predicted value decision unit 15 with the decoded predicted reference value of each image frame and the decoded flags of the individual blocks.

The predicted value decision unit 15 receives the predicted reference value of each image frame and the flags of the individual blocks decoded by the variable-length decoder 11; receives from the dequantizer 13 the neighboring predicted value, which is the DC component of the immediately previous block before the dequantization; makes a decision from the input flag as to which of the predicted reference value or neighboring predicted value of the immediately previous block is selected as the predicted value; and supplies the adder 12 with the selected predicted reference value or neighboring predicted value of the immediately previous block as the predicted value.

The adder 12 receives the difference values and AC components of the individual blocks from the variable-length decoder 11; receives the predicted reference value or neighboring predicted value of the immediately previous block from the predicted value decision unit 15 as the predicted value; obtains the DC components of the individual blocks by adding the difference values of the individual blocks and the predicted value; and outputs the obtained DC components of the individual blocks and the input AC components of the individual blocks.

The dequantizer 13 dequantizes the DC components and AC components of the individual blocks. The inverse converter 14 carries out the inverse orthogonal transformation of the dequantized DC components and AC components of the individual blocks, and outputs the decoded image signal.

Although the present embodiment 9 decodes the image signal passing through the highly efficient encoding by the image encoding apparatus of the foregoing embodiment 2, it can also decode the image signal passing through the highly efficient encoding by the image encoding apparatus of the foregoing embodiment 3 to embodiment 7 by the same configuration.

As described above, the present embodiment 9 offers an advantage of being able to decode the image signal passing through the highly efficient encoding by the image encoding apparatus.

INDUSTRIAL APPLICABILITY

As described above, the image encoding apparatus in accordance with the present invention is suitable for carrying out highly efficient encoding of the first block and blocks with weak correlation with neighboring blocks. In addition, the image decoding apparatus in accordance with the present invention is suitable for decoding the image signal passing through the highly efficient encoding.

What is claimed is:

1. An image encoding apparatus comprising:
a converter receiving an image signal, and carrying out orthogonal transformation on a block by block basis of an image frame to convert the image signal of individual block to DC components and AC components;
a predicted reference value generator receiving the image signal, and generating a predicted reference value of each image frame from DC components obtained by orthogonal transformation of only left-edge blocks of the image frame;
a differential unit obtaining values between the DC components output from said converter and the predicted reference value generated by said predicted reference value generator, wherein
said image encoding apparatus carries out quantizing and variable-length encoding of the AC components and the difference values obtained by said differential unit, carries out quantizing and variable-length encoding of the predicted reference value to be added to a header, and outputs the encoded AC components and difference values along with the encoded predicted reference value added to the header as a bit stream.

2. The image encoding apparatus according to claim 1, wherein said predicted reference value generator generates the predicted reference value of each image frame by obtaining an average value, mode or median of the DC components of the left-edge blocks of the image frame.

3. The image encoding apparatus according to claim 1, wherein said predicted reference value generator generates the predicted reference value of a present image frame from the DC components resulting from orthogonal transformation of left-edge blocks of a past image frame or future image frame.

4. An image decoding apparatus comprising:
a variable-length decoder decoding difference values and AC components of individual block contained in a bit stream, and decoding a predicted reference value of each image frame generated from DC components of only left-edge blocks of the image frame added to a header; and
an adder obtaining the DC components by adding the difference values and the predicted reference value, which are decoded by said variable-length decoder, wherein
said image decoding apparatus outputs a decoded image signal by carrying out dequantization and inverse orthogonal transformation of the AC components and the DC components obtained by said adder.

5. An image encoding method comprising:
receiving an image signal, and carrying out orthogonal transformation, by utilizing a converter, on a block by block basis of an image flame to convert the image signal of individual block to DC components and AC components;

receiving the image signal, and generating a predicted reference value of each image frame from DC components obtained by orthogonal transformation of only left-edge blocks of the image frame;

obtaining difference values between the DC components and the predicted reference value;

quantizing and variable-length encoding of the AC components and the difference values;

quantizing and variable-length encoding of the predicted reference value to be added to a header; and outputting the encoded AC components and difference values along with the encoded predicted reference value added to the header as a bit stream.

6. The image encoding method according to claim 5, further comprising:

generating the predicted reference value of each image frame by obtaining an average value, mode or median of the DC components of the left-edge blocks of the image frame.

7. The image encoding method according to claim 5, further comprising:

generating the predicted reference value of a present image frame from the DC components resulting from orthogonal transformation of left-edge blocks of a past image frame or future image frame.

8. An image decoding method comprising:

decoding, by utilizing a variable-length decoder, difference values and AC components of individual block contained in a bit stream, and decoding a predicted reference value of each image frame generated from DC components of only left-edge blocks of the image frame added to a header; and obtaining the DC components by adding the difference values and the predicted reference value, which are decoded by said variable-length decoder, wherein outputting a decoded image signal by carrying out dequantization and inverse orthogonal transformation of the AC components and the DC components.

* * * * *